Aug. 6, 1929.  C. L. FAIRFAX  1,723,341
CONVERTIBLE SLED
Filed Nov. 25, 1927
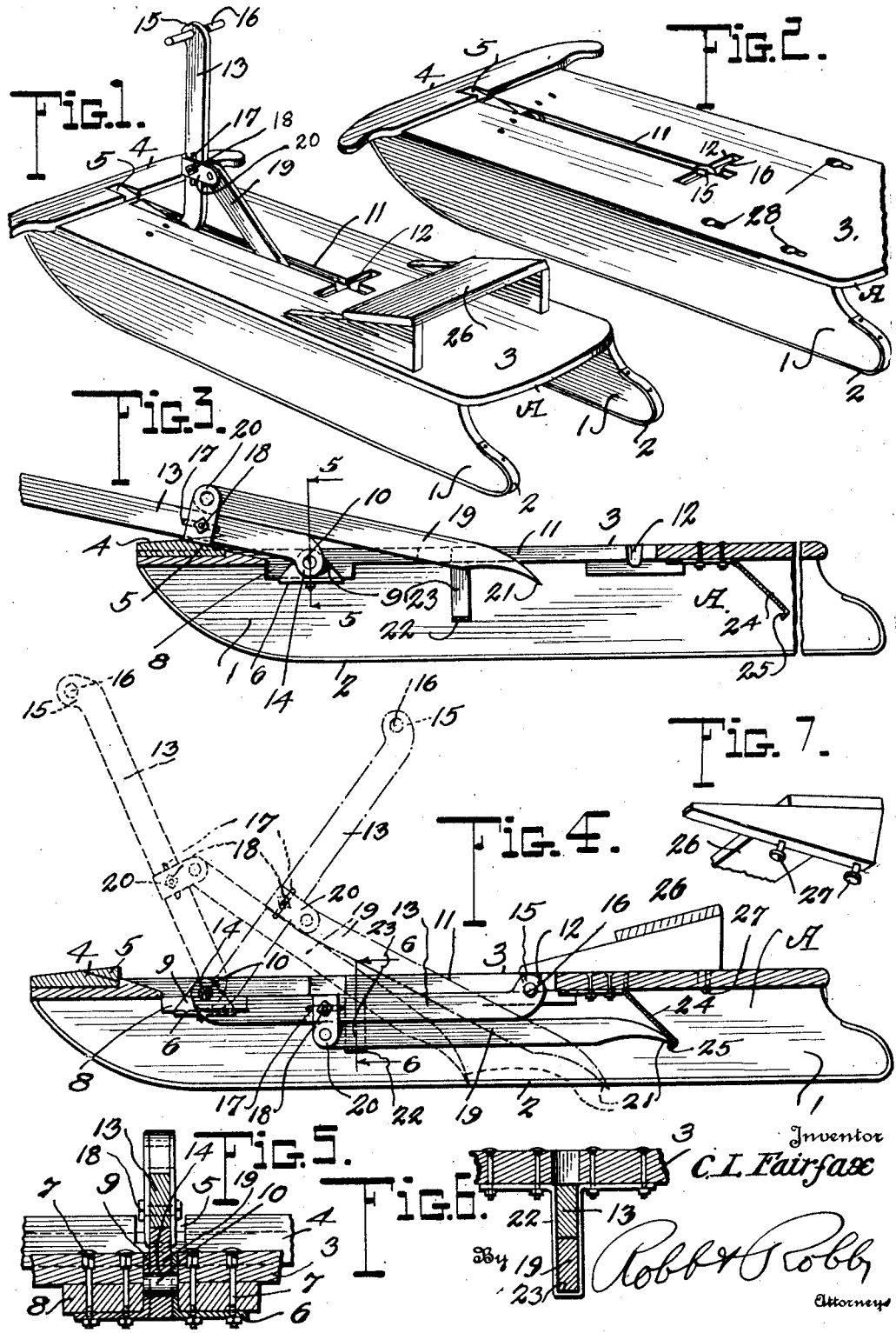
Inventor
C. L. Fairfax
By Robb & Robb
Attorneys Patented Aug. 6, 1929.

1,723,341

UNITED STATES PATENT OFFICE.

CHARLES L. FAIRFAX, OF EAST CLEVELAND, OHIO.

CONVERTIBLE SLED.

Application filed November 25, 1927. Serial No. 235,733.

The primary object of this invention is to provide a sled that is capable of use in the conventional manner, when conditions favor such use, and which is convertible into a sled of the self propelling or traction type. It might be well to here mention that I consider it of paramount importance to so adapt the sled to the changes necessary to convert it from one form to another that only a slight amount of work will be entailed by the conversion.

In carrying out the above noted ideas, I avail of certain propelling instrumentalities together with a sled of any appropriate design. Such a sled differs from the well known types only in the modifications which adapt it to use with the propelling instrumentalities provided for by this invention.

Among the important features of this invention is the construction of the propelling mechanism which includes a member that is capable of use as a handle or member by which the sled may be pulled, when desired. This member is what might be termed the actuating member of the propelling mechanism, which also includes an ice or snow engaging spike connected to the actuating member. A more detailed feature of the invention is the novel relationship between these parts. When the actuating member is used as a handle to pull the sled it is naturally moved into a forwardly inclined position, in which event the ice engaging spike is raised upwardly out of engagement with the surface upon which the sled is positioned.

In accordance with the main idea of this invention the propelling mechanism is so constructed and designed that it may be completely collapsed beneath the upper surface of the sled, whereby it may be used in the manner of the so-called belly flopper; this also being made possible by the provision of a detachable connection between a seat and the sled.

Still another noteworthy feature of the invention is the provision of means by which the propelling mechanisms are held out of engagement with the surface upon which the sled operates when said mechanism is in its collapsed state.

This invention also provides for an adjustable connection between the actuating member and the ice engaging spike, whereby variability in the leverage between these parts is afforded.

Various other more detailed objects and advantages will in part become apparent, and in part be hereinafter stated as the description of the invention proceeds. For a complete understanding thereof reference may be had to the following description and accompanying drawings in which:

Figure 1 is a perspective of the sled with the propelling mechanism in position for use.

Figure 2 is a perspective, somewhat fragmentary, illustrating the sled when the propelling instrumentalities are collapsed and the sled is adapted for use as a so-called belly flopper.

Figure 3 is a longitudinal cross section showing in detail the construction of the propelling instrumentalities, together with the means for holding them upraised from the surface upon which the sled operates. This view also shows the manner in which the ground engaging spike is held out of engagement with the surface of the ground when the actuating member is in extended position for use as a handle.

Figure 4 is a view similar to Figure 3, showing the propelling instrumentalities in their collapsed state; also dotted line positions of these instrumentalities at various stages of their operating cycle.

Figure 5 is a detailed cross sectional view taken on the line 5—5 of Figure 3.

Figure 6 is a detailed cross section taken on the line 6—6 of Figure 4.

Figure 7 is a fragmentary perspective of one end of the seat, showing more particularly the headed bolts by which the seat is affixed to the sled.

While the preferred form of the invention is hereinafter set forth, it is to be understood that I am not to be limited to the exact constructions described, because various modifications of these details may be provided in putting the invention into practice within the purview of the appended claim.

Like reference characters denote corresponding parts throughout the various figures of the drawings.

While in the present instance I have shown the invention as applied to one type of sled it will be apparent that the mechanism provided for by this invention could well be availed of in connection with any conventional type sleds. In the drawings the sled is designated by the reference character A. This sled comprises the side members 1, carrying runners 2. The members 1 are connected at their tops by the member 3, which constitutes the main body member of the sled. At the front of the sled the member 3 is cut away to provide room for the mounting of a foot rest 4, which has a recess 5 therein for a purpose to be later set forth.

On the under surface of the member 3 are mounted brackets 6, which are affixed thereto by bolts 7. Intermediate the horizontal arms of the brackets 6 and body 3 of the sled blocks 8 may be interposed to afford rigidity. It will be noted that the brackets 6 have spaced, vertically extending arms 9 which function to provide a support for a pivotal member 10.

The member 3 is provided, intermedate its ends, with a slot 11 which extends longitudinally thereof for the major portion of its length, and at one end this slot merges into the recess 5 in the foot rest, while adjacent the other end is a cross slot or opening 12. The brackets 6 are mounted with the arms 9 on each side of the slot 11 so that the pivot 10 extends across the bottom portion thereof.

An actuating member 13 is pivotally mounted on the member 10. It will be apparent that the forward swinging movement of this member is limited by the foot rest 4. When in its extreme forward position this actuating member will partially fit into the recess 5, whereby a more rigid connection with the sled is afforded when the actuating member is availed of as a handle for pulling purposes. It is notable that each end of the member 13 is offset, as shown at 14 and 15. The pivotal mounting is located at the offset end 14, while a handle 16 is fastened thereto at the offset 15. Intermediate the offset portions the member 13 is provided with a slot 17. A bracket 20 partially encloses the actuating member 13 so as to provide free ends between which a ground engaging spike 19 is pivotally mounted. A nut and bolt 18 extends between the sides of the bracket 20 and passes through the slot 17. It will be apparent that this construction provides an adjustable connection between the spike 19 and actuating member 13. The ground engaging spike 19 has at one end a point 21, which is adapted to bite or dig into ice or snow to provide a positive ground engagement. A yoke 22 is affixed to the under side of the sled by bolts, or other suitable fastening means, to provide the U-shaped recess 23. In communication with the slot 11 a spring 24, having an end flange 25, is also affixed to the under side of the sled in substantial alignment with the slot 11. A seat 26 is detachably fastened to the member 3 by headed bolts 27 and keyhole slots 28.

When the sled is to be used as a traction or self propelling one the seat 26 is in position and a person sitting thereon will permit his feet to rest on foot rest 4. Upon a forward movement of the actuating member 13 the ground engaging spike 19 is moved forwardly. A rearward movement of the actuating member 13 will cause a forward movement of the sled. This is due to the fact that the pointed end 21 of the ground engaging spike will dig or bite into the ice or snow upon which the sled is operating. It will be apparent, therefore, that a somewhat intermittent forward movement is imparted to the sled upon the operation of the actuating member 13 in the manner described. If the occasion arises, the sled may be pulled by grasping the handle 16 on the actuating member 13. As previously set forth the forward movement of the member 13, relative to the sled, is limited by the foot rest 4. When in the extreme position the ground engaging spike 19 will be removed from the surface upon which the sled is operating, as clearly shown in Figure 3.

When the sled is to be used in the manner of the so-called belly flopper the seat 26 is detached and the operating instrumentalities moved rearwardly and downwardly so that the handle 16 fits into the recess 12. It will be noted that the yoke 22 limits the downward movement of the members 19 and 13 and causes them to move into closed position with respect to one another. The end 21 will engage the spring 24 and be held in position by the flange 25. An adjustable connection of the bracket 18 affords variability in the relative leverage between the actuating member and the ground engaging spike. By adjusting this connection the operation of the sled may be adapted to a wide variety of conditions.

Having thus described my invention what I claim as new, and desire to secure by Letters Patent of the United States, is:

Propelling mechanism of the class described, comprising, in combination, a sled member having a recess therein, an actuating member mounted in the recess, a ground engaging member connected to the actuating member and movable in the recess, and a yoke member fastened to the under side of the sled midway of the length of the recess for holding the propelling instrumentalities removed from the ground when they are in their collapsed state.

In testimony whereof I affix my signature.

CHARLES L. FAIRFAX.